(12) United States Patent
Kivimäki

(10) Patent No.: US 7,269,738 B1
(45) Date of Patent: Sep. 11, 2007

(54) HIGH THROUGHPUT AND FLEXIBLE DEVICE TO SECURE DATA COMMUNICATION

(75) Inventor: Tommi Kivimäki, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/148,781

(22) PCT Filed: Dec. 16, 1999

(86) PCT No.: PCT/EP99/10026

§ 371 (c)(1),
(2), (4) Date: Aug. 6, 2002

(87) PCT Pub. No.: WO01/45318

PCT Pub. Date: Jun. 21, 2001

(51) Int. Cl.
*G06F 11/30* (2006.01)

(52) U.S. Cl. ...................... 713/189; 713/171; 713/191; 713/193; 380/28; 380/29; 380/30; 380/277

(58) Field of Classification Search ................ 713/191, 713/160, 189, 171, 193; 365/189.05; 380/28–30, 380/277
See application file for complete search history.

(56) References Cited

U.S. PATENT DOCUMENTS

| | | | |
|---|---|---|---|
| 5,018,197 A | | 5/1991 | Jones et al. |
| 5,166,978 A | | 11/1992 | Quisquater |
| 5,375,169 A | * | 12/1994 | Seheidt et al. ............... 713/171 |
| 5,805,503 A | * | 9/1998 | Camarota ............... 365/189.05 |
| 6,654,889 B1 | * | 11/2003 | Trimberger .................. 713/191 |
| 6,694,430 B1 | * | 2/2004 | Zegelin et al. ............... 713/160 |

FOREIGN PATENT DOCUMENTS

EP 0 877 385 A2 11/1998

OTHER PUBLICATIONS

Jacob et al. : Memory Interfacing and Instruction Specification for Reconfigurable Processors: ACM/SIGDA International Symposium on Field Programmable Gate Arrays, US, New York, NY: ACM; Feb. 21, 1999, pp. 145-154.*
Jacob et al.: Memory Interfacing and Instruction Specification for Reconfigurable Processors: ACM/SIGDA International Symposium on Field Programmable Gate Arrays, US, New York, NY: ACM; Feb. 21, 1999, pp. 145-154, XP000868486.

* cited by examiner

*Primary Examiner*—Kim Vu
*Assistant Examiner*—Baotran N. To
(74) *Attorney, Agent, or Firm*—Squire, Sanders & Dempsey L.L.P.

(57) ABSTRACT

The present invention provides a device for securing data communication, said device being part of a system and comprising a dynamically reconfigurable logic array comprising separate blocks for algorithms needed for carrying out an application by the use of said device; a common memory means for storing configuration bitstreams, wherein each of said configuration bitstreams corresponds to a block; a configuration memory means for storing configuration bitstreams currently needed to configure said logic array; and a processing means for controlling a reconfiguration of said logic array and for configuring needed blocks into said logic array by use of said configuration bitstreams, said processing means being capable of communicating with other devices of said system.

28 Claims, 4 Drawing Sheets

HIGH THROUGHPUT AND FLEXIBLE DEVICE TO SECURE DATA COMMUNICATION

PRIORITY CLAIM

This is a U.S. national stage of PCT application No. PCT/EP99/10026, filed on Dec. 16, 1999. Priority is claimed on that application.

FIELD OF THE INVENTION

The present invention relates to a device for securing data communication, wherein the device is a part of a system, and to a method of controlling a dynamical reconfiguration of a logic array in such a device for securing data communication. Particularly, the device and the method according to the present invention can be applied to a method of performing a secured communication between two parties in a network.

RELATED BACKGROUND ART

Securing data is one of the most crucial things in current and future data networks. The basic functionalities that are required are private and public key encryption, message authentication, and key exchange. In embedded systems, these functions require so much computing power that a microprocessor cannot handle them by itself, wherein especially a high data throughput is required. Additional hardware must be used to handle security functions. These additional hardware implementations have utilized microprocessors, Digital Signal Processors (DSP), Field Programmable Gate Arrays (FPGA) (referred to as conventional FPGA in the present description), or an Application Specific Integrated Circuit (ASIC).

A microprocessor offers a great flexibility. Its operation can be changed very easily and thus the adding of support for new algorithms is trivial and the device can change its behavior even "on-the-fly" (during operation).

However, strong encryption algorithms require so much computing power that high throughputs cannot be obtained. That is, microprocessors have a very low performance if they have to handle a large flow of data. Accordingly, since strong encryption algorithms require so much computing power, the throughput achieved by a software implementation is very low.

DSPs have the flexibility of a software implementation, a higher performance than microprocessors provided that multiplication and division operations are needed, and a possibility to add support for new algorithms.

However, DSPs perform other functions very poorly. Security functions do contain a lot more than just divisions and multiplications. This results in a poor performance comparison to FPGAs and ASICs.

Conventional FPGAs offer a high data throughput, but only a very limited flexibility which allows maintenance operations of the device, but no run-time flexibility (maintenance means in the present context that the behavior of the device can only be changed if the device is reset, reprogrammed, and booted up again). Stated in other words, conventional FPGA devices can be reconfigured to add support for new algorithms, but they cannot be reconfigured on-the-fly. Rather, it requires that the FPGA is reset, reconfigured and booted up again. During this procedure the conventional FPGA cannot operate. Hence, all the algorithms that are needed must be downloaded inside the FPGA at once. This leads to a poor utilization of silicon area, since only a small portion of the design is active at any given time. Depending on the application some algorithms may be idle even for days or months. However, a poor utilization of silicon area increases the system costs, since a large FPGA is needed. This means also a higher power consumption and a larger area required from a printed circuit board (PCB).

Therefore, conventional FPGAs offer only a limited flexibility. They are not suitable for real time-applications, where data security services must be always available.

A very high data throughput can be achieved using ASICs. However, ASIC designs have a long design cycle, and once the ASIC has been manufactured its configuration cannot be modified. As a consequence, when a support for a new algorithm is needed, a new ASIC has to be designed. Moreover, a new ASIC may also require some modifications to the Printed Circuit Board (PCB) or even a totally new PCB. As a conclusion, ASICs do not offer any flexibility at all.

Thus, since these known devices always sacrifice either a high data throughput or flexibility, both advantages are not achieved by these.

SUMMARY OF THE INVENTION

Therefore, it is an object of the present invention to provide a device to secure data communication, which comprises a high throughput and flexibility.

According to the present invention, this object is solved by a device for securing data communication, said device being part of a system and comprising a dynamically reconfigurable logic array comprising separate blocks for algorithms needed for carrying out an application by the use of said device; a common memory means for storing configuration bitstreams, wherein each of said configuration bitstreams corresponds to a block; a configuration memory means for storing configuration bitstreams currently needed to configure said logic array; and a processing means for controlling a reconfiguration of said logic array and for configuring needed blocks into said logic array by use of said configuration bitstreams, said processing means being capable of communicating with other devices of said system.

This device can according to the present invention be advantageously modified, if it further comprises miscellaneous logic means, and if this means further comprise at least a random number generator.

Moreover, according to the present invention there is provided a method of controlling a dynamical reconfiguration of a logic array in a device for securing data communication, said controlling being carried out by a processing means of said device and said method comprising the steps of monitoring internal logic states of a dynamically reconfigurable logic array of said device; deciding as a result of said monitoring step whether a new block is required in said logic array or not, and if not, returning to said monitoring step; configuring said new block into said logic array if a new block is required; deciding whether it is necessary to pass data from a replaced block to said replacing new block, and if not, returning to said monitoring step; and passing data to said new block if there is a need to pass data, and returning to said monitoring step.

This method can be very advantageously applied to a method of performing a secured communication between two parties in a network, said method comprising the steps of performing a message authentication after the begin of said communication for validating information; using a public key encryption for setting up the connection; negotiating a private key encryption and a secret key to be used; converting the connection from public key encryption to private key encryption by the use of a key exchange algorithm; securing the data by the use of said private key encryption until there is a need to change said secret key or said communication is ended; and changing said secret key if there is a need, by repeating the steps of negotiating, converting, and securing, wherein every step corresponds to an algorithm being contained in a block of a dynamically reconfigurable logic array of a device for securing data communication. Namely, only those blocks are present in said logic array which are currently needed to perform said secured communication, and according to that, unneeded blocks are exchanged by executing the method of controlling a dynamical reconfiguration of a logic array in a device for securing data communication.

Further advantageous modifications of the device and the method of the present invention are as set out in the further dependent claims.

Accordingly, a device is provided, which implements all the computing intensive basic functions that are needed in order to secure data communication, i.e. data securing transactions. These functions include private and public key encryption, key exchange, message authentication, and hash functions.

This device does not function as a stand alone device. It is designed to be connected as a subsystem to an embedded system that can be any network appliance. The network appliance requests security services from the device described according to the present invention. The device then performs the needed security functions. The present application describes a general purpose security device, which can support any security algorithms and which operation can be adapted to any environment.

The device according to the present invention corresponds to a new approach to solve the problem of implementing security functions with high data throughput but still maintaining flexibility in embedded systems. Consequently, the device of the present invention, an implementation of which can be called a Hybrid Dynamically Reconfigurable Field Programmable Gate Array (hybrid DR FPGA), offers almost the same flexibility as software does. It supports upcoming algorithms and changing the behavior of the device on-the-fly, and at the same time it provides the same high data throughput as a conventional FPGA implementation.

In detail, the device according to the present invention combines the raw bit-processing power of a conventional FPGA with the flexibility of a microprocessor implementation. Dynamic reconfigurability allows a much higher flexibility to a hardware implementation of security functions than any other solution and approaches microprocessors in this respect.

A implementation of the device according to the present invention offers a much higher performance than a microprocessor or DSP implementations while performing security functions. However, it still can provide almost as much flexibility.

This hybrid DR FPGA approach according to the present invention offers the chance of reconfigurability when compared to traditional ASIC implementation. That enables the upgrade path to add support for new algorithms that is lacking in ASIC implementations.

The device according to the present invention offers the possibility to add support for new algorithms and to fine tune the already existing algorithms on-the-fly while the device is operating. That is not possible with conventional FPGAs or ASICs. The possibility is opened to encrypt different data packets with different algorithms or to change the used hash function of the authentication based on the connection, etc.

Dynamic reconfigurability increases the utilization of the silicon area by multiplexing the tasks in time-domain. Fewer logic gates are needed than in a conventional FPGA system which leads to decreased system cost and smaller power consumption. It requires that the design is divided into smaller blocks, which are more manageable than one huge design. Last but not least the hard-wired microprocessor inside the present device handles the reconfiguration controller duties. It can be also used to perform such functions that can be more efficiently performed on software than hardware.

According to the present invention there is presented a generic and adaptive cryptographic hardware device, which is not tied up to any specific standard or protocol. The present device can support the most common cryptographic functions, and can be adapted to any environment automatically by executing a dynamic reconfiguration of logic resources. There is no built-in support for any standard or protocol. The support for some standard or protocol arises from the way in which the present device is applied.

BRIEF DESCRIPTION OF THE DRAWINGS

Preferred embodiments of the present invention are described herein below in detail by way of example with reference to the accompanying drawings, in which.

DETAILED DESCRIPTION OF THE PREFERRED EMBODIMENTS

It should be noted that it is very advantageous to integrate all means of the device of the present invention into one die. That way, the processing means and the logic array are tightly coupled, and the processing means handling the reconfiguration controller duties has a more direct and fast connection to the logic array. Of course, this also saves a lot of PCB area by decreasing the amount of chips to one. Accordingly, integrating all the functionalities inside one chip makes the present device very tamper resistant.

As a result, the following description generally directs by way of example to an accordingly integrated device. However, it is remarked that it is also possible to use means being implemented separately.

Figure 1:
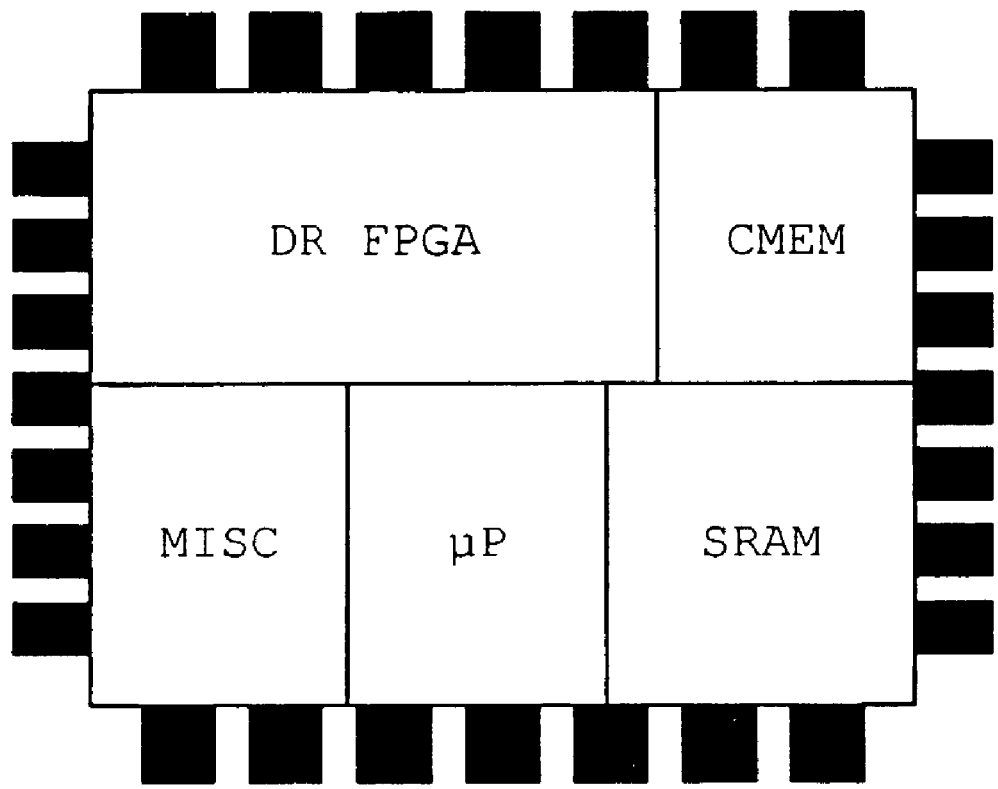
FIG. 1 shows a preferred embodiment of the device according to the present invention.

Reference is now made to FIG. 1. As mentioned above, according to the present invention a processing means µP such as a microprocessor (in the following: microprocessor), memory means, and other miscellaneous logic are implemented together with a logic array such as a Field Programmable Gate Array FPGA. That kind of a device could be called a hybrid-FPGA. If the programmable gate array part of the chip can be dynamically reconfigured, the device could be called a hybrid DR FPGA. The microprocessor is hard-wired into the chip, so logic resources are not used for that. The memory means are divided into configuration memory means CMEM for the gate array and common memory means SRAM for the microprocessor inside the chip. The reference character MISC denotes all sorts of miscellaneous logic.

Dynamic reconfiguration means that the configuration of the logic array DR FPGA can be changed on-the-fly. The main limitation for the performance is reconfiguration overhead, which is the time it takes to reconfigure the chip.

Figure 2:
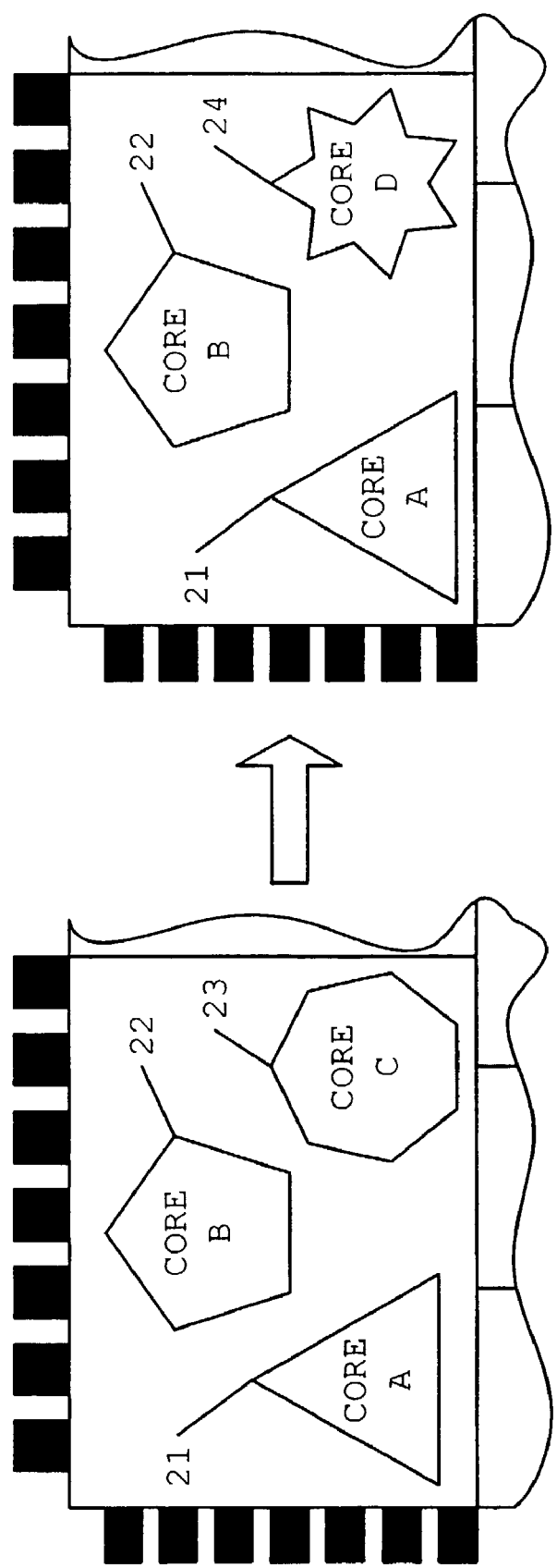
FIG. 2 illustrates the principle of a partial reconfiguration of a dynamically reconfigurable logic array underlying the preferred embodiment of the present invention.

To address this problem, partial reconfiguration is used. It means that part of the logic array can be reconfigured without having an effect on other portions of the array. This requires that the design is divided into blocks 21, 22, 23 or cores A, B, C, as is shown in FIG. 2. One or more of these blocks can be reconfigured, while the other blocks 21, 22 are operating. A partial reconfiguration is done by writing only into selective areas of the configuration memory means. If a mere short block needs to be reconfigured it also means that the reconfiguration bitstream is short and the reconfiguration happens very quickly.

Partial reconfiguration is illustrated in FIG. 2, where the logic array part of the hybrid DR FPGA is shown. There are three cores A, B, and C running in the logic array. Then partial reconfiguration is used to remove core C from the array and configure core D into the free logic space. At the same time cores A and B are running and partial reconfiguration process does not affect their operation.

As regards performing a secured communication, all the needed algorithms for encryption, authentication, and key exchange are designed and implemented as separate blocks. The design can be even more fine-grained, so that one algorithm is build up from several smaller blocks, sub-blocks. A good example could be HMAC message authentication, where the hash function could be a sub-block. That would allow changing the underlying hash function on-the-fly, while still using the same authentication protocol.

All the blocks, the sub-blocks included, have their own configuration bitstream. These bitstreams are stored into the common memory means SRAM. The configuration memory means CMEM holds only those bitstreams that are currently needed to configure the logic array DR FPGA. The microprocessor of the present device functions as a reconfiguration controller and configures the needed blocks into the logic array. This is done by reading the configuration bitstream from the common memory means SRAM and writing it to the configuration memory means CMEM. The logic array DR FPGA makes this on-the-fly reconfiguration possible by supporting the partial reconfiguration. It is not always necessary to change the blocks in the logic array DR FPGA. They can be also be fine-tuned by changing their parameters on-the-fly.

Figure 3:
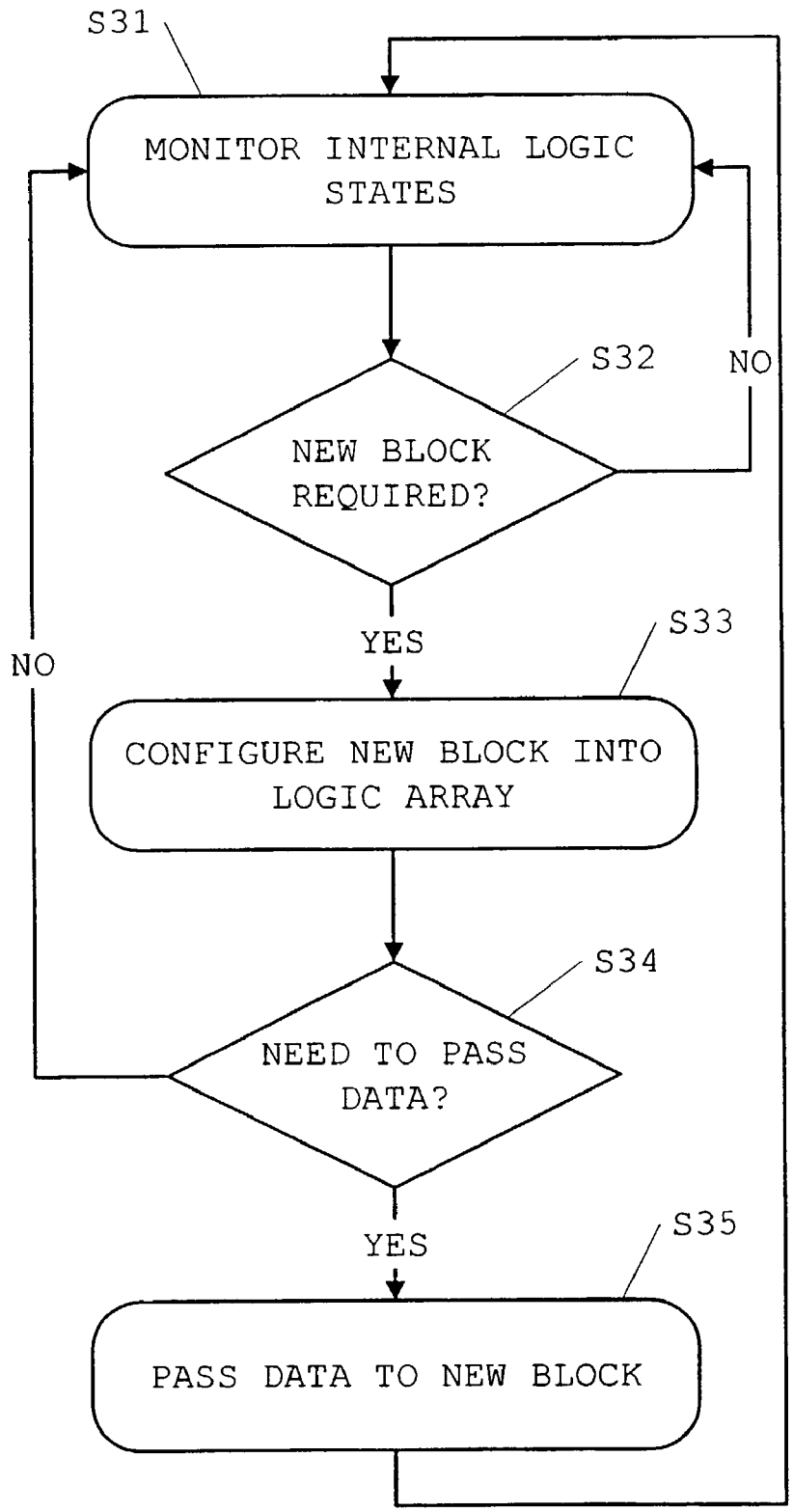
FIG. 3 shows a flow chart illustrating a method of controlling a dynamical partial reconfiguration of a logic array in a device according to the present invention.

Referring now to FIGS. 2 and 3, a method according to the present invention of operating the reconfiguration controller will be described.

In a step S31, the reconfiguration controller μP monitors the internal logic states of the dynamically reconfigurable logic array DR FPGA. In a step S32, the controller μP decides whether a new block is required or not. If no requirement for a new block is present, the method returns to the monitoring step S31, otherwise a new block 24 (core D) is configured into the logic array DR FPGA in a step S33. Specifically, the controller μP downloads a respective bitstream from the common memory means SRAM and writes it into the configuration memory means CMEM. The controller μP has to write the bitstream into an appropriate location of the configuration memory means CMEM, which location depends on the current configuration of the logic array DR FPGA, meaning that it is not a fixed location. The step S33 includes such read and write operations, although they are not shown in FIG. 3 for the sake of a clear illustration.

Anyway, if an old block 23 is replaced by a new block 24, it might be necessary that data is passed from that old block 23 to the new block 24. This is decided in a step S34, according to which the method either returns to the initial step S31 or proceeds further to a step S35 in which data is passed to the new block 24. Evidently, at this point at the latest the loop to step S31 is closed.

Figure 4:
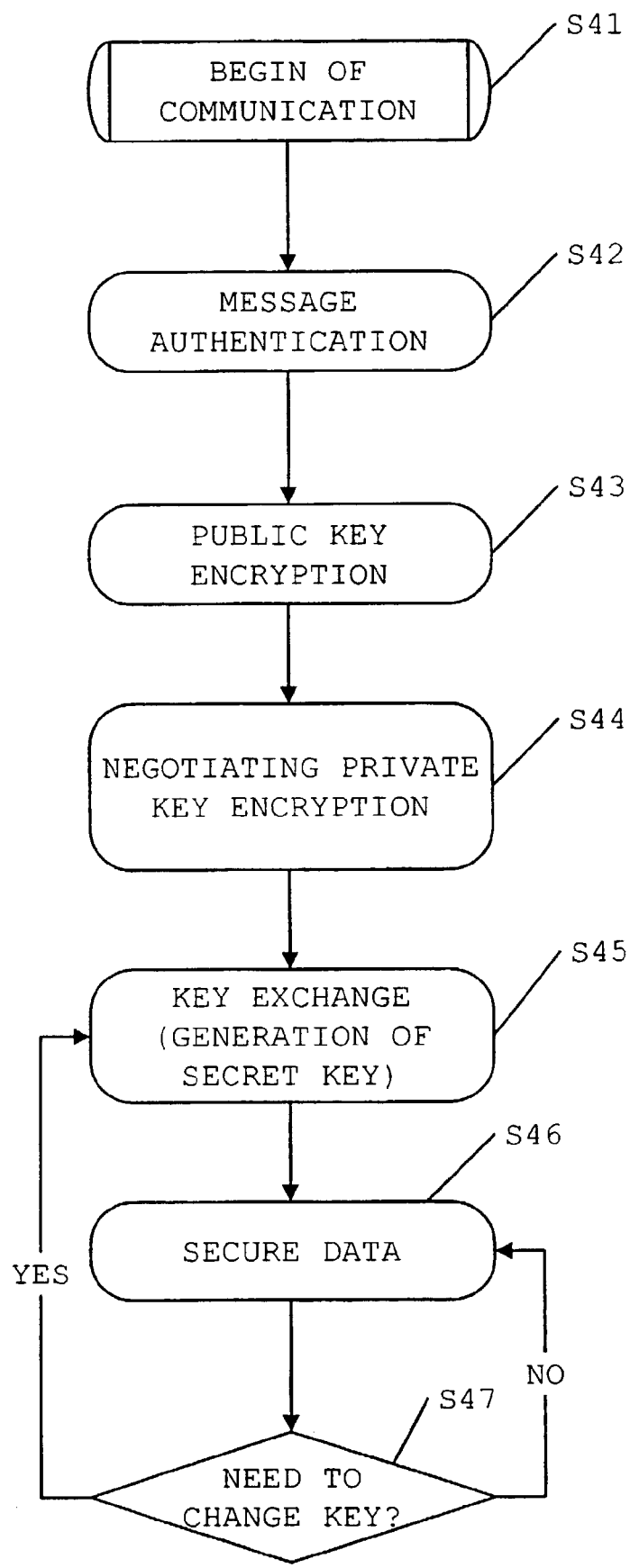
FIG. 4 shows a flow chart illustrating an example of a method of performing a secured communication to which the present invention can be applied.

An example of a secured communication between two parties is depicted in FIG. 4. Accordingly, when two parties begin to communicate with each other in a step S41, a message authentication algorithm is used to validate the information in a step S42. The reconfiguration controller μP reads the message authentication bitstream from the common memory means SRAM and writes it into the configuration memory means CMEM.

After the authentication of the message, a public key encryption algorithm is used for connection setup in a step S43. At this point, the reconfiguration controller μp removes the message authentication block from the logic array DR FPGA and configures the public key encryption algorithm into the logic array DR FPGA. The connection setup includes negotiating the used private key encryption algorithm, which corresponds to step S44.

After the negotiation is over, a key exchange algorithm is used to generate the secret key and to convert the connection from public key encryption to private key encryption according to a step S45. The key exchange algorithm is configured in the logic array DR FPGA and the public key encryption algorithm is removed from the logic array DR FPGA.

After that, in a step S46, the private key encryption algorithm is used to secure the data. The private key algorithm replaces the key exchange algorithm in the logic array DR FPGA.

The communication data is secured using the private key algorithm until there is a need to change the key. This is decided in the step S47. In order to change the key, the necessary algorithms are once again configured into the logic array DR FPGA, which corresponds to a loop back to step S45. After the exchange has been performed, data is secured using again the private key algorithm, but this time with a different secret key.

The example above illustrates how the device actually operates. In an implementation, an additional logic can pass outputs of a previous algorithm to an input of a next algorithm. The microprocessor μp can also be used to pass this information. It is further possible that these algorithm changes are somewhat interleaved, which means that the next algorithm is configured into the logic array DR FPGA while the previous algorithm is still performing some of its functions. Interleaving is a good solution if there is a complex communication between two algorithms during the algorithm change. Specific details how these algorithms work together depends on what algorithms are used and how they are applied.

Hence, for an application according to the above example of a secured communication between two parties in a network, the device of the present invention supports a public key encryption algorithm, a private key encryption algorithm, a message authentication code function, hash functions, and a key exchange algorithm, and the device should comprise a random number generator.

Public and private key encryption algorithms are used to encrypt the information, so they are very essential. Common algorithms that might be supported are Rivest, Shamir, Adleman (RSA) and ElGamal for the public key encryption and Data Encryption Standard (DES), DESX, and Triple-DES (3DES -3-round DES) for private key encryption. The support for other common or upcoming algorithms can also be added.

Message authentication is used to validate the information transmitted between two parties of a network. The message authentication can be based on a hash function, a stream cipher, or a block cipher. It means that hash functions, like Message Digest algorithm (MD5) and Secure Hash algorithm (SHA-1) might be needed. If a stream cipher or a block cipher based message authentication is required, the same block or stream based encryption algorithms that are needed to encrypt the data can be applied to this task too.

A common algorithm for a key exchange is the Diffie-Helmann.

Also other algorithms could be supported in order to maintain the interoperability with other devices.

A good random number generator is very crucial to any security device. It is used to generate keys. The best way to get a true random number generator is to implement a noisy pn-junction onto the die. Then a logic block is needed to measure that noise. This would require a small analog to digital (Converter and a digital logic to create the needed keys.

Another possibility is to use a pseudo random number generator. A distinctive drawback of a pseudo random number generator is that the numbers are necessarily periodic. It is important to use a cryptographically strong pseudo random number generator and a good seed. The generator can be based for example on DES encryption algorithm or hash functions, and thus can take use of the already designed algorithms.

A device is tamper resistant if it is designed so that an attacker cannot access the cryptographic keys or otherwise modify the behavior of the hardware to compromise security.

Therefore, the security device according to the present invention comprises preferably an internal random number generator for keys. Further, all the keys are also stored inside the device, so an attacker cannot have an access to them.

However, there is still one weak link which resides in updating the device. If a totally new algorithm is required, the corresponding bitstream has to be downloaded into the common memory means SRAM of the device from some external source. There are two ways to make sure that an attacker cannot interpret the design of the device, even if he or she can read the bitstream from the data bus.

The first way is to design a proprietary format for the bitstream. The second way is to encrypt the bitstream. Of course, the final solution can be even a combination of both of these. The second way seems to be more practical, since the encryption method can be changed if wanted. It only requires that the device already supports the algorithm, which is used to encrypt the bitstream. If only a proprietary bitstream format is used, there is a risk that an attacker can get an access to that information somehow. After that he or she can interpret the design. If it appears on some reasons to be necessary to change the bitstream format, than this would require that the device is partly redesigned.

These design methods do not make the device bullet proof, since there is no such thing as a totally tamper resistant hardware. However, they make it very difficult and expensive to attack against this device.

As is described above, the present invention provides a device for securing data communication, said device being part of a system and comprising a dynamically reconfigurable logic array DR FPGA comprising separate blocks 21, 22, 23, 24 for algorithms needed for carrying out an application by the use of said device; a common memory means SRAM for storing configuration bitstreams, wherein each of said configuration bitstreams corresponds to a block 21, 22, 23, 24; a configuration memory means CMEM for storing configuration bitstreams currently needed to configure said logic array DR FPGA; and a processing means µP for controlling a reconfiguration of said logic array DR FPGA and for configuring needed blocks 24 into said logic array DR FPGA by use of said configuration bitstreams, said processing means µP being capable of communicating with other devices of said system.

It should be understood that the above description and accompanying figures are only intended to illustrate the present invention by way of example only. The preferred embodiments of the present invention may thus vary within the scope of the attached claims.

What is claimed is:

1. A device, comprising:
a dynamically reconfigurable logic array (DR FPGA) comprising separate blocks for storing algorithms needed for performing an application by the use of said device to secure data communication;
a common memory unit for storing configuration bitstreams, wherein each of said configuration bitstreams corresponds to a block;
a configuration memory unit for storing configuration bitstreams currently needed to configure said DR FPGA; and
a processing unit for controlling a reconfiguration of said DR FPGA and for configuring needed blocks into said DR FPGA by use of said configuration bitstreams, said processing unit being configured to monitor internal logic states of the DR FPGA, determine whether a new block is required in said DR FPGA based on a result of said monitored internal logic states, continue to monitor said internal logic states if a new block is not required in said DR FPGA, configure said new block into said DR FPGA if a new block is required in said DR FPGA, determine whether data should be passed from a replaced block to said new block, continue to monitor said internal logic states if data should not be passed from the replaced block to said new block, pass data to said new block if there is a need to pass data from the replaced block to said new block, and communicate with other devices of a system, only those blocks currently needed to perform said secured communication being present in said DR FPGA, and unneeded blocks being exchanged by controlling said reconfiguration;
wherein said device forms part of said system and is configured to perform message authentication after a beginning of a communication for validating information, set up a connection using a public key encryption, negotiate a private key encryption, generate a secret key and convert the connection from public key encryption to private key encryption by use of a key exchange algorithm, secure data by the use of said private key encryption until there is a need to change said secret key or said communication is ended, repeat generation of said secret key and convert the connection from public key encryption to private key encryption by use of a key exchange algorithm to change said secret key if there is a need to change said secret key;

and secure said data by the use of said private key encryption using said changed secret key.

2. The device of claim 1, further comprising miscellaneous logic means (MISC).

3. The device of claim 2, wherein said MISC comprise at least a random number generator.

4. The device of claim 1, wherein said common memory means, configuration memory unit and processing unit are integrated into one die.

5. The device of claim 4, wherein said blocks correspond to at least one of a public key encryption algorithm, a private key encryption algorithm, message authentication, hash functions and key exchange.

6. The device of claim 5, wherein said public key encryption algorithm comprises at least one of Rivest-Shamir-Adleman and ElGamal.

7. The device of claim 5, wherein said private key encryption algorithm comprises at least one of Data Encryption Standard (DES), DESX and Triple-DES.

8. The device of claim 5, wherein said message authentication is based on one of a hash function, a stream cipher or a block cipher.

9. The device of claim 8, wherein said hash function comprises a Message Digest (MD5) algorithm or a Secure Hash algorithm (SHA-1).

10. The device of claim 8, wherein an identical block or stream based encryption algorithm is applied for message authentication on an as needed basis to encrypt data.

11. The device of claim 5, wherein an algorithm for said key exchange is Diffie-Helmann.

12. The device of claim 4, wherein said random number generator is obtained by implementing a noisy pn-junction onto the die of said device, said noise being measured by a logic means comprising at least an analog to digital converter and a digital logic for creating needed keys.

13. A method, comprising:
controlling a dynamic reconfiguration of a logic array in a device for securing data communication, said controlling being performed by a processing unit of said device to provide secured communication between two parties in a network, said controlling comprising:
monitoring internal logic states of a dynamically reconfigurable logic array (DR FPGA) of said device;
determining whether a new block is required in said DR FPGA based on a result of said monitoring;
returning to said monitoring if a new block is not required in said DR FPGA;
configuring said new block into said DR FPGA if a new block is required in said DR FPGA;
determining whether data should be passed from a replaced block to said new block;
returning to said monitoring if data should not be passed from the replaced block to said new block;
passing data to said new block if there is a need to pass data from the replaced block to said new block; and
returning to said monitoring;
performing a message authentication after a beginning of communication for validating information;
setting up a connection using a public key encryption;
negotiating a private key encryption;
generating a secret key and converting the connection from public key encryption to private key encryption by use of a key exchange algorithm;
securing data by the use of said private key encryption until there is a need to change said secret key or said communication is ended;
repeating said generating step to change said secret key if there is a need to change said secret key; and
securing said data by the use of said private key encryption using said changed secret key;
wherein every step corresponds to an algorithm contained in a block of the DR FPGA of the device for securing data communication, only those blocks which are currently needed to perform said secured communication are present in said DR FPGA, and wherein unneeded blocks are exchanged by executing said controlling step.

14. The method of claim 13, wherein a respective own configuration bitstream is associated to each block, said bitstreams being stored in common memory means, and said processing means configures the new block into said DR FPGA by reading a respective configuration bitstream from said common memory means and writing said respective configuration bitstream into configuration memory means.

15. The method of claim 14, wherein said processing means updates said device by downloading bitstreams corresponding to new algorithms from an external source into said common memory means of said device, said bitstreams being encrypted by an encryption algorithm which is already supported by said device.

16. The method of claim 13, wherein said keys are generated by utilizing a random number generator of said device.

17. The method of claim 13, wherein said public key encryption is performed in accordance with one of a Rivest Shamir-Adleman algorithm or an ElGamal algorithm.

18. The method of claim 13, wherein said private key encryption is performed in accordance with one of a Data Encryption Standard (DES) algorithm, a DESX algorithm or a Triple-DES algorithm.

19. The method of claim 13, wherein said message authentication is based on one of a hash function, a stream cipher or a block cipher.

20. The method of claim 13, wherein said hash function is a Message Digest algorithm (MD5) or a Secure Hash algorithm (SHA-1).

21. The method of claim 13, wherein block or stream based encryption algorithm is applied for message authentication on an as needed basis to encrypt data.

22. The method of claim 13, wherein the algorithm for said key exchange is Diffie-Helmann.

23. The device of claim 2, wherein said common memory means, configuration memory means, processing means and MISC are integrated into one die.

24. The device of claim 3, wherein said common memory means, configuration memory means, processing means and MISC are integrated into one die.

25. The device of claim 1, wherein the common memory means comprise an SRAM, the configuration memory means comprise a CMEM and the processing means comprises a microprocessor.

26. The device of claim 14, wherein the common memory means comprise an SRAM, the configuration memory means comprise a CMEM and the processing means comprises a microprocessor.

27. A device, comprising:
a dynamically reconfigurable logic array (DR FPGA) comprising separate blocks for storing algorithms needed for performing an application by the use of said device to secure the data communication;
a common memory means for storing configuration bitstreams, wherein each of said configuration bitstreams corresponds to a block;

a configuration memory means for storing configuration bitstreams currently needed to configure said DR FPGA; and a processing means for controlling a reconfiguration of said DR FPGA and for configuring needed blocks into said DR FPGA by use of said configuration bitstreams, said processing means being configured to monitor internal logic states of the DR FPGA, determine whether a new block is required in said DR FPGA based on a result of said monitored internal logic states, continue to monitor said internal logic states if a new block is not required in said DR FPGA, configure said new block into said DR FPGA if a new block is required in said DR FPGA, determine whether data should be passed from a replaced block to said new block, continue to monitor said internal logic states if data should not be passed from the replaced block to said new block, pass data to said new block if there is a need to pass data from the replaced block to said new block, and communicate with other devices of a system, only those blocks currently needed to perform said secured communication being present in said DR FPGA, and unneeded blocks being exchanged by controlling said reconfiguration;

wherein said device forms part of said system and is configured to perform message authentication after a beginning of a communication for validating information, set up a connection using a public key encryption, negotiate a private key encryption, generate a secret key and convert the connection from public key encryption to private key encryption by use of a key exchange algorithm, secure data by the use of said private key encryption until there is a need to change said secret key or said communication is ended, repeat generation of said secret key and convert the connection from public key encryption to private key encryption by use of a key exchange algorithm to change said secret key if there is a need to change said secret key, and secure said data by the use of said private key encryption using said changed secret key.

28. A computer-readable medium encoded with a computer program executed by a computer that causes secured communication between two parties in a network, comprising:

program code for controlling a dynamic reconfiguration of a logic array in a device for securing data communication, said controlling being performed by a processing unit of said device, said controlling comprising:

program code for monitoring internal logic states of a dynamically reconfigurable logic array (DR FPGA) of said device;

program code for determining whether a new block is required in said DR FPGA based on a result of said monitoring;

program code for returning to said monitoring if a new block is not required in said DR FPGA;

program code for configuring said new block into said DR FPGA if a new block is required in said DR FPGA;

program code for determining whether data should be passed from a replaced block to said new block;

program code for returning to said monitoring if data should not be passed from the replaced block to said new block;

program code for passing data to said new block if there is a need to pass data from the replaced block to said new block; and program code for returning to said monitoring;

program code for performing a message authentication after a beginning of communication for validating information;

program code for setting up a connection using a public key encryption;

program code for negotiating a private key encryption;

program code for generating a secret key and converting the connection from public key encryption to private key encryption by use of a key exchange algorithm;

program code for securing data by the use of said private key encryption until there is a need to change said secret key or said communication is ended;

program code for repeating said generating step to change said secret key if there is a need to change said secret key; and program code for securing said data by the use of said private key encryption using said changed secret key;

wherein the program code corresponds to an algorithm contained in a block of the DR FPGA of the device for securing data communication, only those blocks which are currently needed to perform said secured communication are present in said DR FPGA, and wherein unneeded blocks are exchanged by executing said program code for controlling the reconfiguration.

* * * * *